(12) United States Patent
Vogelgesang

(10) Patent No.: US 7,568,330 B2
(45) Date of Patent: Aug. 4, 2009

(54) FIELD CHOPPER AND METHOD OF OPERATION

(75) Inventor: Claus-Josef Vogelgesang, Mandelbachtal (DE)

(73) Assignee: Deere & Company, Moline, IL (US)

( * ) Notice: Subject to any disclaimer, the term of this patent is extended or adjusted under 35 U.S.C. 154(b) by 475 days.

(21) Appl. No.: 11/453,397

(22) Filed: Jun. 15, 2006

(65) Prior Publication Data

US 2007/0010305 A1    Jan. 11, 2007

(30) Foreign Application Priority Data

Jul. 6, 2005    (DE) ........................ 10 2005 031 549

(51) Int. Cl.
*A01D 69/08*    (2006.01)
(52) U.S. Cl. ........................ 56/11.8; 56/10.2 R; 56/11.3
(58) Field of Classification Search .............. 56/10.2 R, 56/10.2 A, 10.2 G, 10.2 H, 10.8, 11.3, 11.7, 56/11.8, 16.4 R, 16.4 A
See application file for complete search history.

(56) References Cited

U.S. PATENT DOCUMENTS

| | | | |
|---|---|---|---|
| 5,527,218 A * | 6/1996 | Van den Bossche et al. ... | 460/20 |
| 6,052,978 A * | 4/2000 | Kempf ......................... | 56/119 |
| 6,810,649 B2 * | 11/2004 | Kempf ..................... | 56/16.4 R |

FOREIGN PATENT DOCUMENTS

| | | |
|---|---|---|
| DE | 196 32 977 | 8/1996 |
| DE | 297 02 902 | 2/1997 |
| DE | 198 12 500 | 3/1998 |
| DE | 101 10 232 | 3/2001 |
| DE | 102 07 467 | 2/2002 |
| DE | 102 20 699 | 5/2002 |
| DE | 102 41 788 | 9/2002 |
| EP | 0 986 946 | 4/1995 |
| EP | 1 402 769 | 3/2004 |

OTHER PUBLICATIONS

European Search Report, Nov. 7. 2006, 5 Pages.

* cited by examiner

*Primary Examiner*—Thomas B Will
*Assistant Examiner*—Alicia Torres

(57) ABSTRACT

A field chopper and a method for its operation. The field chopper includes an internal combustion engine in drive connection with a crop intake device, a chopping device, and a feeding device that transfers crop from the intake device to the chopping device. A controller, connected to an operator input, sets the drive speed of the feeding device. Upon input for starting the chopping operation, the controller triggers the following steps: bringing the drive speed of the feeding device to a reduced speed, closing a coupling to the crop intake device, and bringing the drive speed of the feeding device to a desired value.

10 Claims, 4 Drawing Sheets

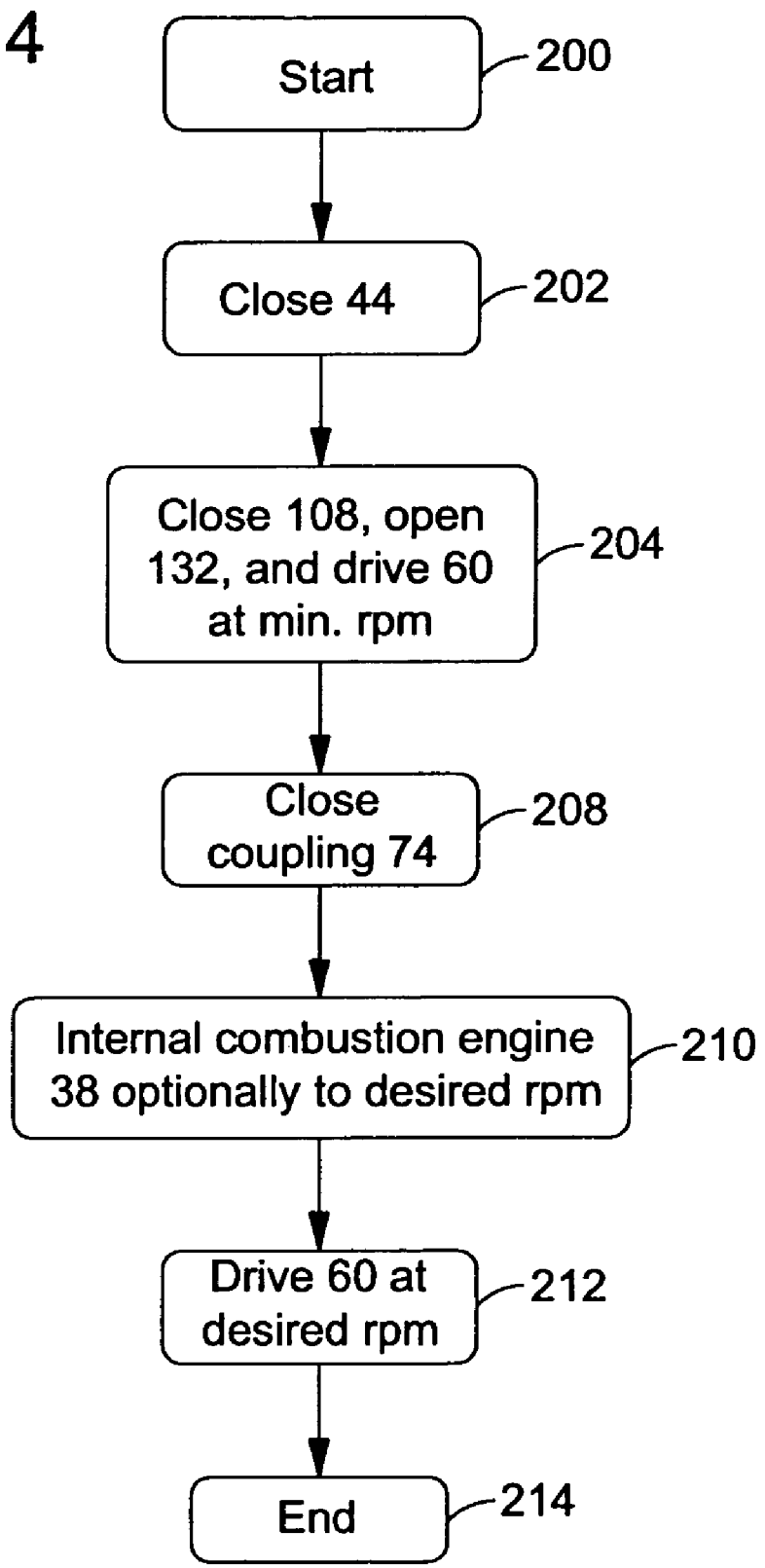

FIELD CHOPPER AND METHOD OF OPERATION

BACKGROUND

1. Field of the Invention

The invention relates to a field chopper with an internal combustion engine, which is connected to drive a crop intake device, a chopping device, and a feeding device designed for transporting crops from the crop intake device to the chopping device, and with a controller, which is designed for engaging and disengaging the drive of the crop intake device and to an operator input device, which enables input for setting the chopping operation. The invention also relates to a method for operating the field chopper.

2. Related Technology

Field choppers are used in agriculture to cut or collect crops from a field by means of a crop intake device, to feed these crops via feeding device to a chopping device, usually a chopping cylinder or a disk pate chopper, in order to chop these crops and to discharge them, usually after being accelerated by means of a blower, through an ejection bend adjustable in position onto a transport vehicle. In most cases, the harvested plants are used as silage fodder for feeding animals.

The crop intake device, the feeding device, and also the chopping device are driven by an internal combustion engine. The cutting length is defined by the usually variable speed of the feeding device and the rpm of the chopping device dependent on the rpm of the internal combustion engine. In the state of the art, mechanical gears that can be switched in steps, hydraulic drives (U.S. Pat. No. 5,901,535), or planetary gears, which comprise hydraulically and mechanically driven elements (U.S. Pat. No. 6,052,978) are used for selecting the cutting length. Consequently, the speed of the feeding device can be changed by operating input or based on sensor values (U.S. Pat. No. 7,189,160). The crop intake device is driven by a remote-controllable coupling (see U.S. Pat. No. 6,810,649), which enables an operator to set the crop intake device in motion before the beginning of the chopping operation.

When the coupling of the crop intake device is disengaged, often so-called overlengths, i.e., cut material with a cut length that is greater than the desired or set cutting length, are produced. These overlengths are produced due to the fact that the crops still present in the feeding device at the beginning are not properly gripped by the chopping device and therefore are not ejected with a reduced size as a whole or at least not at the desired measure. In addition, the couplings for the feeding device and the crop intake device are relatively strongly loaded, when these are engaged and suddenly set to their desired speed.

In the state of the art, various automated mechanisms for engaging a harvesting header (U.S. Pat. No. 6,073,429) or disengaging the drive of a field chopper (U.S. Pat. No. 5,527,218), as well as devices for setting the rpm of an internal combustion engine of a field chopper have been described (DE 101 10 232 A), which, however, cannot solve the described problem.

As seen from above, there remains a need for a field chopper in which the production overlength is reduced during the starting of the chopping operation.

SUMMARY

The field chopper includes, in a known way, an internal combustion engine that is in drive connection via a drive train with a chopping device, a feeding device, and a crop intake device. A controller controls the speed of the feeding device and also controls a coupling located between the internal combustion engine and the crop intake device. If an operator triggers the start of the chopping operation by means of the operator input device, the controller automatically executes a series of steps.

First, the drive speed of the feeding device is set to a non-zero value, which is below its desired value for a harvesting operation and which, preferably, corresponds at least approximately to a minimum value. Thereafter, the coupling is closed, i.e., the crop intake device is set in operation. Finally, the drive speed of the feeding device is set to the desired value of the speed for harvesting operations, which corresponds to an operator defined input or to an automatically defined value.

In this way the feeding device is driven before and also after the coupling is engaged for a defined time span with a sufficiently low speed, such that undesired overlengths of crops can be prevented by the slow feeding of the crops to the chopping device. The selected, relatively low speed of the feeding device corresponds to a small cutting length of the crops which enables trouble-free conveyance of the crop downstream and also upstream of the chopping device and at the input of the feeding device. After the coupling is closed and the preset time span sufficient for generating and stabilizing the flow of material through the field chopper has elapsed, which can last, e.g., 3 to 10 s, the controller automatically causes a speed, which is input by the operator for the feeding device and which corresponds to a desired cutting length, to be set. Alternatively, an automatically defined speed of the feeding device is selected, which is defined, e.g., with reference to the moisture of the crop or with reference to its mechanical properties.

Through the automatic algorithm, undesired overlengths during the starting of the chopping operation are prevented. As a result, wear on the coupling in the drive train of the feeding device is reduced. Also, the risk that foreign matter will reach the chopping device is reduced because this foreign matter can be detected easily by a metal detector of the feeding device due to the low conveyance speed.

In a preferred embodiment of the invention, after an operator input signals the desire to start the chopping operation, the drive speed at the input of the coupling of the crop intake device is brought to a speed that is below the desired value of the drive speed of the crop intake device for the harvesting operation and which lies particularly close to a minimum value. The setting of this speed at the input of the coupling of the crop intake device can be before, after, or at the same time as the automatic setting of the speed of the feeding device lying close to the maximum value. When the coupling is engaged, the latter is treated with care because it only has to transfer low loads due to the low speed. In addition, at first due to the low speed of the crop intake device, only a few crops are transported into the feeding device, which prevents blockage at the inlet of the feeding device. Thereafter, the drive speed of the crop intake device at the input of the coupling is brought back to the desired value, which is done preferably only after setting the speed of the feeding device to its desired value for the harvesting operation, in order to prevent blockage at the inlet of the feeding device.

Usually, the crop intake device is connected by a mechanical gear to the internal combustion engine. The mechanical gear has a reduction gear that is fixed or that is variable in steps (e.g., change speed gear) or that is continuously variable (e.g., belt). To change the speed at the input of the coupling of the drive for the crop intake device, i.e., to lower the speed before the coupling is engaged and then to raise the speed, it is suitable to configure the controller for preset rpm values for the internal combustion engine. Consequently, the controller can reduce the rpm of the internal combustion engine before the coupling is engaged, preferably approximately to its idle running rpm, and to raise the value back to an rpm suitable for the harvesting operation after the coupling is engaged, especially to an rpm preset by the operator or defined automatically, e.g., adapted to the reduced power.

In another embodiment, reduction of the rpm of the internal combustion engine is eliminated when it is already running at the nominal rpm. In contrast, in this embodiment if the engine is running at a reduced rpm, e.g., idle running rpm, its rpm is automatically raised to the rpm suitable for the harvesting operation, particularly to an rpm preset by the operator or defined automatically, e.g., adapted to the reduced power, after the coupling is engaged.

In another embodiment, the power from the internal combustion engine is transferred hydraulically to the crop intake device, i.e., by means of a hydraulic gear with a hydraulic pump driven by the internal combustion engine and a hydraulic motor driving the crop intake device. In such an embodiment, the rpm of the internal combustion engine can also be reduced before engaging the coupling (e.g., to an idle running value) and then raised. Additionally or alternatively, the reduction ratio of the hydraulic gear to the reduction of the speed at the input of the coupling changes, i.e., reduced before the coupling is engaged and then raised.

The feeding device is driven preferably by means of a gear whose reduction ratio can be changed by the controller. A suitable gear includes a planetary gear, which has an element driven by the internal combustion engine, an element driven with variable speed, whose speed can be changed by the controller, and also an element driving the feeding device. The element that can be driven with variable speed is slowed before the coupling is engaged relative to its desired speed during the harvesting operation, preferably to its minimum rpm, and accelerated again after the coupling is engaged, in order to lower the speed of the feeding device before the coupling is engaged—and to raise it again after the coupling is engaged.

In another embodiment, the power from the internal combustion engine is transferred purely hydraulically to the feeding device, i.e., by means of a hydraulic gear with a hydraulic pump driven by the internal combustion engine and a hydraulic motor driving the feeding device. Here, the element that can be driven with a variable speed corresponds to the hydraulic motor and the reduction ratio of the hydraulic gear is changed for reducing the speed of the feeding device, i.e., reduced before the coupling is engaged and then increased. The speed of the internal combustion engine can then remain constant.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

An embodiment of the invention, described in more detail below, is shown in the drawings where:

FIG. 4 is a flow chart, according to which the controller controls the drive system of the field chopper at the beginning of the harvesting process.

DETAILED DESCRIPTION

Figure 1:
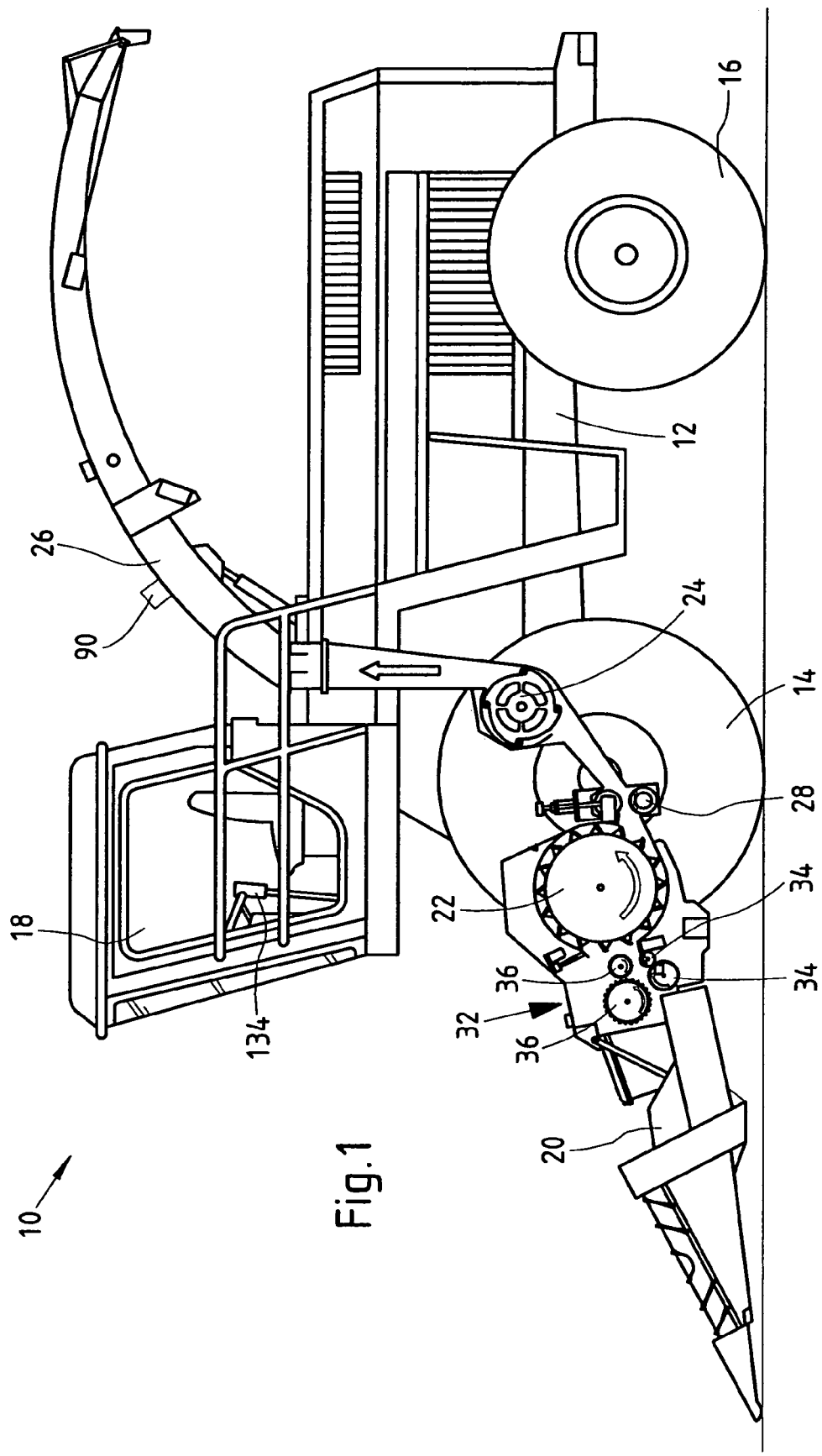
FIG. 1 illustrates a harvesting machine in schematic side view.

A harvesting machine 10 is shown in FIG. 1 in the form of a self-propelled field chopper. The harvesting machine 10 is built on a frame 12, which is carried by front wheels 14 and steerable rear wheels 16. The harvesting machine 10 is operated from a driver cabin 18 that is located such that crop intake 20 is visible therefrom. Material taken in from the ground by means of the crop intake device 20, e.g., corn, grass, or the like, is fed by a feeding device 32 to a chopping device 22, in the form of a chopping cylinder that chops it into small pieces, which discharges it to a conveying device 24. Accordingly, the feeding device is arranged in an intake channel of the field chopper 10 and includes lower intake cylinders 34 and upper intake cylinders 36. Usually the upper intake cylinders 36 can move relative to the lower intake cylinders 34 and are biased toward the latter by a spring force or other means. The material leaves the field chopper 10 via a rotatable discharge elbow 26 to a nearby moving trailer or other transport vehicle (not shown). Between the chopping device 22 and the feeding device 24 there is a regrinding or pressing device 28, which is built from two processor cylinders arranged one above the other and through which the material to be conveyed is fed tangentially to the feeding device 24.

Figure 2:
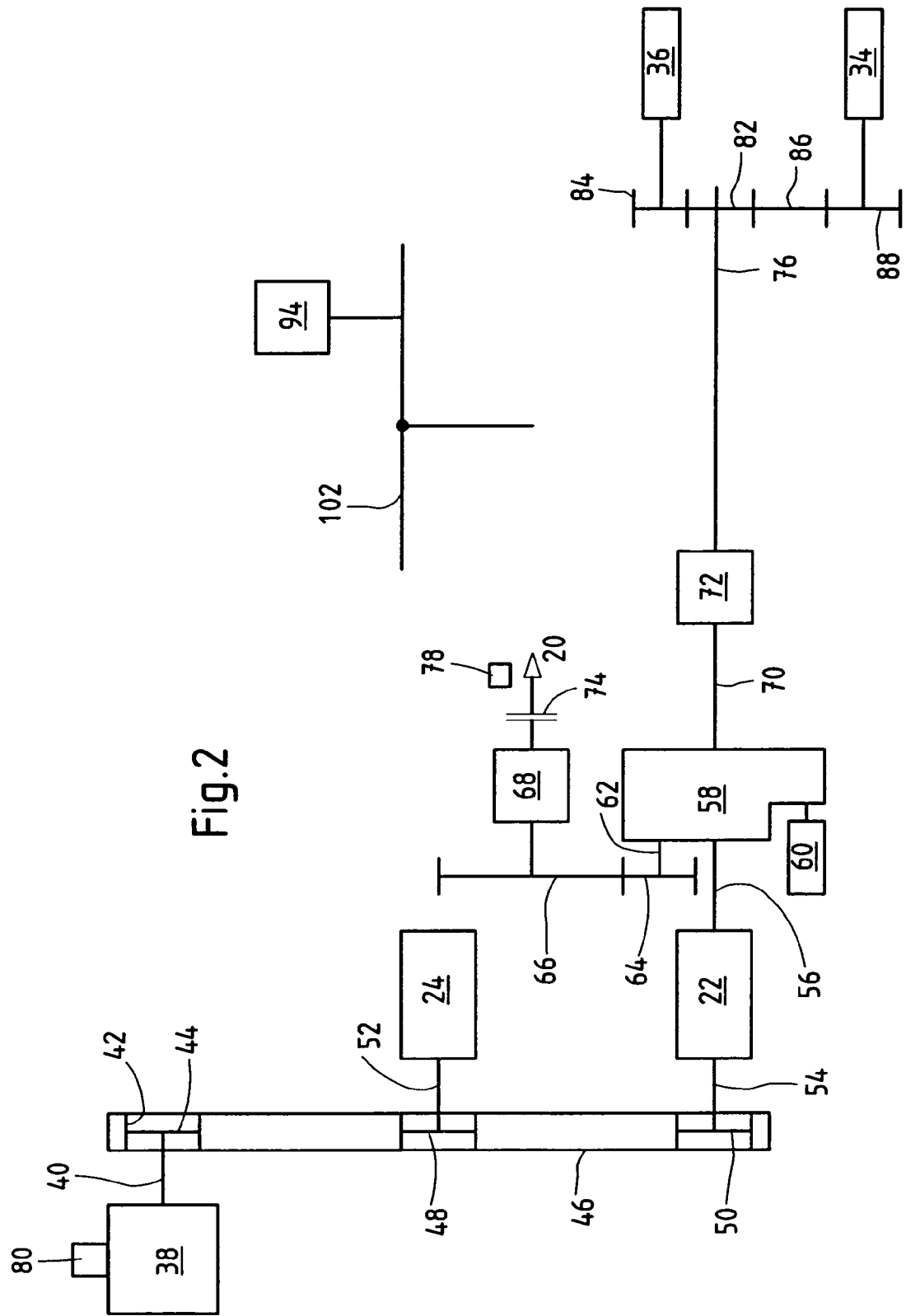
FIG. 2 is a schematic view of the drive system of the material conveying and the material processing element of the harvesting machine.

In FIG. 2, the elements of the drive system of the field chopper 10 are shown schematically. An internal combustion engine 38 is mounted above the rear wheels 16 on the frame 12 and provides the driving torque. By means of a hydraulic pump (not shown), hydraulic motors allocated to the wheels 14, 16 can be driven so as to move the field chopper 10 over a field or a road.

An output shaft 40 of the internal combustion engine 38 drives a first belt disk or pulley 42 via an electric coupling 44 that can be engaged and disengaged. The electric coupling 44 is preferably arranged in the interior of the first belt disk 42. The first belt disk 42 engages with a drive belt 46, which further more engages and drives a second belt disk or pulley 48 and a third belt disk or pulley 50. Tensioning devices are usually allocated to the drive belt 46. Instead of the electric coupling 44, a belt tensioning device that can be engaged and disengaged could be used to connect or disconnect the drive connection between the drive belt 46 and the internal combustion engine 38. The second belt disk 48 is coupled via an input shaft or other means 52 to drive the rotor of the conveying device 24. The third belt disk 50 is coupled via the input shaft or other means 54 to drive the chopping device 22.

As schematically illustrated in FIG. 2, on the side of the chopping device 22 opposite the shaft 54, the chopping device 22 is locked in rotation with another shaft (an output shaft) or other means 56, which is coupled with an adjustable gear assembly 58. The adjustable gear assembly 58 is shown in detail in FIG. 3 and is further described below. The adjustable gear assembly 58 is further connected to a hydraulic motor 60 to a driven shaft 62, with which the driven elements of the crop intake device 20 are connected via gears 64, 66, a change speed gear 68 and also a coupling 74. The adjustable gear assembly 58 is also coupled to an output shaft 70 that is driven by the gear assembly 58 and connects, via reduction gear 72, which is coupled on the driven side with a shaft 76. The shaft 76 is in drive connection with the upper intake cylinders 36 and the lower intake cylinders 34, the latter rotating in the opposite sense relative to the upper cylinders via gears 82, 84, 86, and 88.

The change speed gear 68 is used for driving the crop intake device 20 and can be switched into one of three positions, by hand or by an external force-activated actuator (not shown). The three positions include a first position, in which a first reduction ratio is active between the input and output of the change speed gear 68; a second position, in which a second reduction ratio is active; and a third (idle running) position, in which no driven moment is provided. Thus, the change speed gear 68 enables the driven elements of the crop intake device 20 to be driven selectively with either a first or a second speed.

The coupling 74 is equipped with an external force-activated actuator 78, which is used for opening and closing the coupling and which is connected via a data bus 102 to an electronic controller 94.

Figure 3:
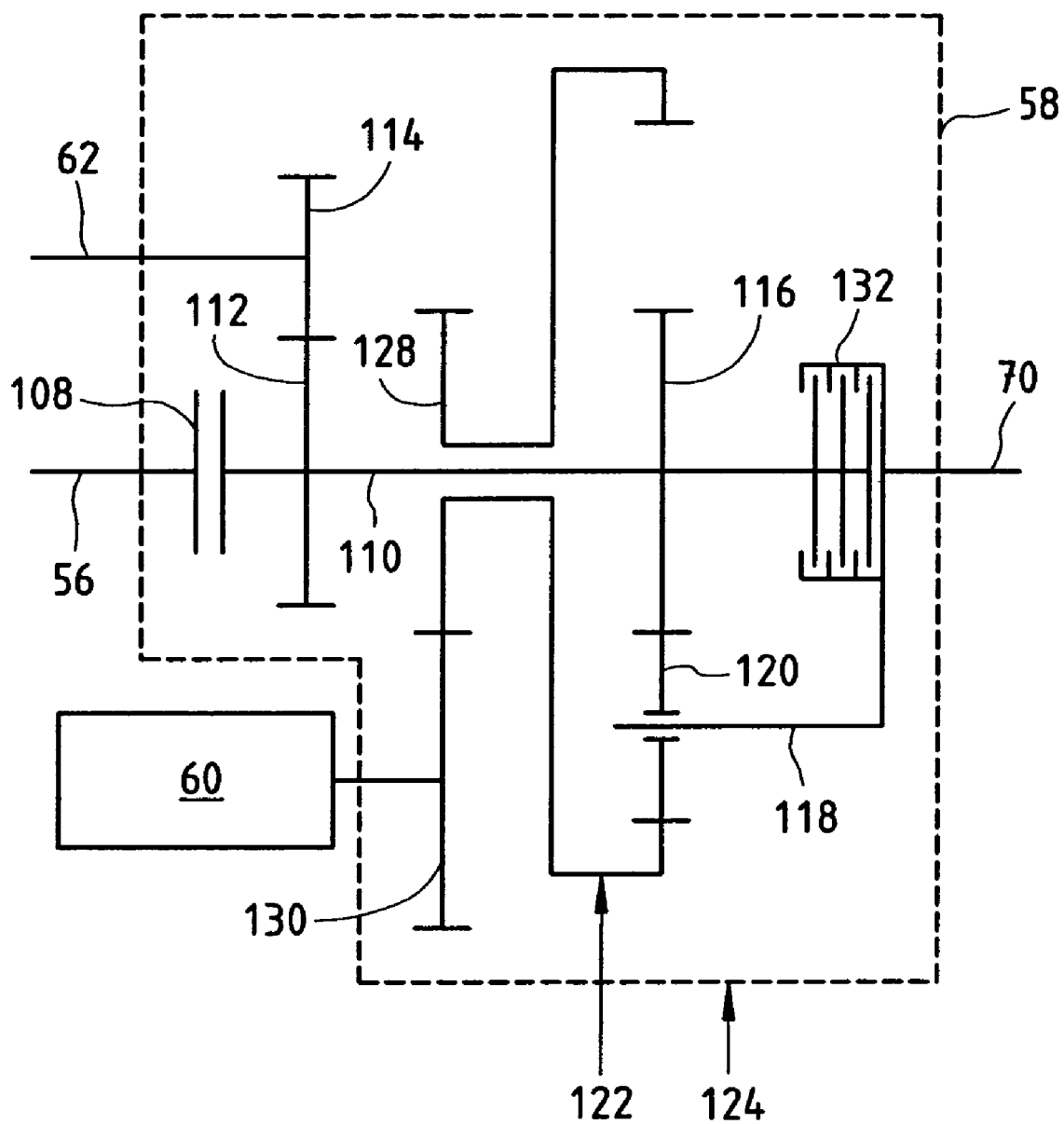
FIG. 3 is a schematic of the adjustable gear of the drive system of FIG. 2.

The adjustable gear assembly 58 is shown in detail in FIG. 3. The other shaft 56 connected to the chopping device 22 is connected in the adjustable gear assembly 58 to a coupling 108 that can be disengaged. On the output side, the coupling 108 is connected to a shaft 110, which drives the driven shaft 62 coupled with the crop intake device 20 via a meshing gear pair 112, 114. The drive moment transferred by the chopping device 22 is thus conducted with a fixed reduction through the gear assembly 58 to the change speed gear 68. In another embodiment, however, the shaft 62 could be coupled with the output shaft 70 in order to enable continuous adjustment of the working speed of the driven element of the crop intake device 20.

The part of the adjustable gear 58 leading to the output shaft 70 is configured as a planetary gear set with a sun wheel or gear 116, a planet wheel carrier 118 with planet wheels 120, a ring wheel 122, and a housing 124. The sun wheel 116 is locked in rotation with the shaft 110, which is supported in the housing 124 so that it can rotate, as are the ring wheel 122 and the planet wheel carrier 118. The shaft 110 extends through a central region of the bell-shaped ring wheel 122. The hydraulic motor 60 is used as the element driven with a variable speed and is driven by a hydraulic pump driven either directly or indirectly by the internal combustion engine 38 and its rpm or rotational speed can be changed by the controller 94. The rpm can be adjusted by either reducing or increasing the feeding amount. Instead of the hydraulic motor 60, an electric motor can also be used.

The planet wheel carrier 118 is set in rotation on one side by the planet wheels 120 and on the other side is connected to the output shaft 70. The planet wheels 120 roll on the planet wheel carrier 118 between the sun wheel 116 and the ring wheel 122, wherein the rotational direction and the speed are adapted to each other according to the ratio of the rpms of the sun wheel 116 and the ring wheel 122. The ring wheel 122 holds the planet wheels 120, the planet wheel carrier 118, and sun wheel 116 in its interior and is provided in its closed region with a gear 128 which is locked in rotation with this gear. This gear 128 meshes with a gear 130, which is driven by the hydraulic motor 60 or is located on its output shaft. The adjustable gear assembly 58 contains another coupling 132, which is locked in rotation with the planet wheel carrier 118 and thus is also connected on the output side to the output shaft 70. This coupling 132 can produce, on the other side, a connection with the shaft 110 and the sun wheel 116. In this way, the entire gear assembly 58 can be blocked. Preferably the other coupling 132 can be activated electromagnetically by the controller 94.

In another embodiment, the adjustable gear assembly 58 is also configured as a planetary gear, but the shaft 110 connects to the ring wheel 122 and the gear 130 of the hydraulic motor 60 drives the sun wheel 116. In other operating modes (e.g., reverse and blade sharpening), in which just the hydraulic motor 60 provides the driving power for the material conveying device, the ring wheel 122 is held stationary. The advantage lies in that the reduction of the planetary gear is then used. The driving power of the hydraulic motor 60 can then be transferred, if necessary, via other drive elements to the chopping device 22.

The described and illustrated drive system enables operation in different operating modes, which can be selected by means of an operator input device 134 arranged in the cabin 18 in the region of the drive and which is mounted on a control lever and is connected to the controller 94. In detail, these modes involve, in particular, a first operating mode, in which a harvesting operation is performed, a second operating mode, in which the blades of the chopping device 22 are sharpened, and a third operating mode, in which a reverse operation is performed. The second and third operating modes are described in more detail in U.S. Pat. No. 6,810,649, whose explanation is not required. Obviously, other operating modes, such as roadway driving and idling, are possible.

The operator input device 134 enables, as already mentioned, the first operating mode for the harvesting operation to be initiated. If the operator activates an appropriate button of the operator input device 134, the controller executes a routine as shown in FIG. 4. After the start in step 200, the electric coupling 44 is closed in step 202. The couplings 108 and 74 are initially opened. The internal combustion engine 38 now sets the conveying device 24 and the chopping device 22 in rotation via the drive belt 46. Via the other shaft 56 and the coupling 108, the chopping device 22 drives the shaft 110, which drives the input side of the coupling 74 via the meshing gear pair 112, 114, the gears 64, 66, and the change speed gear 68. Then, in step 204, the coupling 108 is closed, the coupling 132 is opened, and the hydraulic motor 60 is driven at an rpm in a rotational direction, in which the shaft 70 reaches an rpm, in which it drives the intake cylinders 34, 36 of the feeding device 32 at a relatively low speed, so that this conveys crop possibly located in the feeding device 32 as slowly as possible to the chopping device 22. Now, the shaft 110 drives the sun wheel 116, the hydraulic motor 60 drives the ring wheel 122 via the meshing gears 128, 130 and the planetary gear provides a variable rpm at the output shaft 70 and drives the intake cylinders 34, 36 via the reduction gear 72 and the gears 82-88.

At this point, the internal combustion engine 38 can rotate at its idle running or standing rpm or its desired rpm as used during harvesting operation. The rpm depends on the appropriate operator input. Because the rpm of the chopping device 22 also depends on the rpm of the internal combustion engine 38, the controller 94 takes into account the rpm of the internal combustion engine 38 in the control of the hydraulic motor 60, so that independent of the rpm of the internal combustion engine 38, an approximately constant, relatively short, theoretical cutting length is achieved.

Now if the internal combustion engine 38 rotates at its idle running or standing rpm, the coupling 74 rotates on the input side at a speed that is reduced relative to an internal combustion engine running at its desired rpm (as used during the harvesting operation) and is only slightly loaded in the following step 208, in which it is closed, which is beneficial to its service life. Additionally, if the crop intake device 20 already contains crop, this additional crop is only fed into the feeding device 32 relatively slowly. It would be conceivable to bring the rpm of the internal combustion engine 38 automatically to the idle running or standing rpm, especially before step 202; however, due to the energy requirements necessary for the extra acceleration, this is preferably not done.

In step 210 the controller 94 triggers the engine controller 80 of the internal combustion engine 38 to bring the rpm of the internal combustion engine 38 to its desired rpm, which can be inputted via the operator input device 134 if this has not yet been done. The speed of the crop intake device 20 can be selected by hand or optionally by an input into the input device 134 by means of the controller 94 and an actuator for external force-activated adjustment of the change speed gear 68 in two or more steps. In a preferred embodiment, the change speed gear 68 is switched by the controller 94 before the coupling 74 is engaged in the lower reduction stage and then switched into the higher reduction stage when the operator has not selected the lower reduction stage.

In the next step 212, the hydraulic motor 60 is triggered by the controller 94 to move at its desired speed. The desired speed of the hydraulic motor 60 determines the cutting length of the crop cut by the chopping device 22, which corresponds to a value that can be input (or defined with reference to the signal of a moisture sensor 90) by an operator with the operator input device 134. The controller 94 takes into account the current rpm of the chopping device 22. The series of steps 210 and 212 could also be swapped.

With step 214, the routine ends.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A field chopper for harvesting agricultural crops, the field chopper comprising:
    an internal combustion engine in drive connection with a crop intake device, a chopping device, and a feeding device that transfers crop from the crop intake device to the chopping device;
    a controller coupled to the feeding device and configured to set a drive speed of the feeding device, the controller also being connected to a coupling that engages and disengages a drive of the crop intake device, the controller further being connected to an operator input device that enables input for starting the chopping operation of the field chopper;
    the controller being configured to automatically trigger the following steps for an operator input into the operator input device for starting the chopping operation:
        bringing the drive speed of the feeding device to a speed corresponding to a minimum value below a desired value for the harvesting operation;
        closing the coupling; and
        after a preset time has elapsed, bringing the drive speed of the feeding device up to the desired value.

2. The field chopper according to claim 1, wherein the controller is configured such that the desired value of the drive speed of the feeding device corresponds to one of an operator input or an automatically determined value.

3. The field chopper according to claim 1, further comprising the controller being configured to automatically trigger the following steps for an operator input into the operator input device for starting the chopping operation:
    bringing the drive speed at the input of the coupling to a speed below a desired value before the coupling is closed, and
    after the coupling is closed and preferably before the drive speed of the feeding device is increased to the desired value, bringing the drive speed at the input of the coupling to a speed corresponding to the desired value.

4. The field chopper according to claim 3, wherein the controller is configured such that the speed at the input of the coupling corresponds approximately to a minimum value before the coupling is engaged.

5. The field chopper according to claim 1, wherein the input of the coupling is connected to the internal combustion engine by a mechanical gear with a fixed reduction ratio.

6. The field chopper according to claim 1, wherein the input of the coupling is connected to the internal combustion engine by a mechanical gear with a variable reduction ratio.

7. A field chopper according to claim 1, wherein the controller is configured to set the rpm of the internal combustion engine and to raise the rpm of the internal combustion engine after the coupling is engaged and so as to bring it to the desired rpm.

8. A field chopper according to claim 1, wherein the feeding device is in drive connection with the internal combustion engine via a planetary gear, the planetary gear including an element driven with a variable speed for adjusting the drive speed of the feeding device.

9. A field chopper according to claim 1, wherein the controller is configured to set the rpm of an element driven with variable speed for driving the feeding device and to be operated to slow the element driven with variable speed before the coupling is engaged to bring it at least approximately to a minimum rpm.

10. A method of starting a chopping operation of a field chopper having an internal combustion engine in drive connection with a crop intake device, a chopping device, and a feeding device that transports crop from the crop intake device to the chopping device, the field chopper also having a controller configured to set the drive speed of the feeding device and to engage and disengage a coupling of a drive of the crop intake device, the controller being connected to an operator input device that enables input for starting the chopping operation, the method comprising the following steps:
    upon an operator input into the operator input device for starting the chopping operation, the controller automatically bringing the drive speed of the feeding device to a speed corresponding to a minimum value below a desired value for the harvesting operation, closing the coupling, and bringing the drive speed of the feeding device to the desired value after a preset time has elapsed.

* * * * *